US009885556B2

(12) United States Patent
Zhu et al.

(10) Patent No.: US 9,885,556 B2
(45) Date of Patent: Feb. 6, 2018

(54) DUAL-FREQUENCY GRATING INTERFEROMETER DISPLACEMENT MEASUREMENT SYSTEM

(71) Applicant: TSINGHUA UNIVERSITY, Beijing (CN)

(72) Inventors: Yu Zhu, Beijing (CN); Ming Zhang, Beijing (CN); Leijie Wang, Beijing (CN); Jinchun Hu, Beijing (CN); Longmin Chen, Beijing (CN); Kaiming Yang, Beijing (CN); Dengfeng Xu, Beijing (CN); Wensheng Yin, Beijing (CN); Haihua Mu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 255 days.

(21) Appl. No.: 14/441,828

(22) PCT Filed: Oct. 28, 2013

(86) PCT No.: PCT/CN2013/086023
§ 371 (c)(1),
(2) Date: May 8, 2015

(87) PCT Pub. No.: WO2014/071806
PCT Pub. Date: May 15, 2014

(65) Prior Publication Data
US 2015/0268031 A1 Sep. 24, 2015

(30) Foreign Application Priority Data
Nov. 9, 2012 (CN) .......................... 2012 1 0448734

(51) Int. Cl.
*G01B 9/02* (2006.01)
*G01D 5/26* (2006.01)
(Continued)

(52) U.S. Cl.
CPC ..... *G01B 9/02007* (2013.01); *G01B 9/02049* (2013.01); *G01B 11/14* (2013.01); *G01D 5/266* (2013.01); *G01D 5/38* (2013.01)

(58) Field of Classification Search
CPC .. G01B 9/02; G01B 9/02007; G01B 9/02003; G01B 9/02049; G01B 2290/45;
(Continued)

(56) References Cited

U.S. PATENT DOCUMENTS 4,912,530 A 3/1990 Bessho
5,436,724 A * 7/1995 Ishizuka ............... G03F 9/7049
250/237 G
2011/0096334 A1 4/2011 Ishizuka

FOREIGN PATENT DOCUMENTS

CN 1384334 A 12/2002
CN 102937411 A 2/2013
(Continued)

OTHER PUBLICATIONS

Wang Guochao, "Research on Long-range Nanometer Displacement by Dual Wavelength and Singal Grating," Dissertation, Nov. 2010, pp. I-71.
(Continued)

*Primary Examiner* — Tarifur Chowdhury
*Assistant Examiner* — Jonathon Cook

(57) ABSTRACT

A dual-frequency grating interferometer displacement measurement system, comprises a dual-frequency laser, an interferometer, a measurement grating and an electronic signal processing component. The measurement system realizes displacement measurement based on grating diffraction, optical Doppler effect and optical beat frequency theory. Dual-frequency laser light is emitted from the dual-frequency laser and split into reference light and measurement light via a polarization spectroscope. The measurement light is incident to the measurement grating to generate positive
(Continued)

and negative first-order diffraction. The diffraction light and the reference light form a beat frequency signal containing displacement information about two directions at a photo-detection unit, and linear displacement output is realized after signal processing. The measurement system can realize sub-nanometer and even higher resolution and accuracy, and is able to measure long horizontal displacement and vertical displacement at the same time.

8 Claims, 6 Drawing Sheets

(51) Int. Cl.
*G01D 5/38* (2006.01)
*G01B 11/14* (2006.01)
(58) Field of Classification Search
CPC .. G01B 2290/70; G01B 11/002; G01B 11/14; G01D 5/266; G01D 5/268; G01D 5/38; G01D 5/34715; G03F 7/70775; G03F 7/7049
USPC .......................... 356/486, 487, 488, 498, 499
See application file for complete search history.

(56) References Cited

FOREIGN PATENT DOCUMENTS

| CN | 102944176 A | 2/2013 |
|---|---|---|
| JP | 2003-156310 A | 5/2003 |
| WO | WO 2010/030179 A1 | 3/2010 |

OTHER PUBLICATIONS

Yu Haili, "Research on large stroke nan-positioning technology and application based on dual-frequency laser interferometer," Dissertation, 2011, pp. I-121.

Akihide Kimura et al., "Design and construction of a two-degree-of-freedom linear encoder for nanometric measurement of stage position and straightness," Precision Engineering 34, 2010, pp. 145-155, Elsevier.

International Search Report for PCT/CN2013/086023 filed Oct. 28, 2013.

* cited by examiner

DUAL-FREQUENCY GRATING INTERFEROMETER DISPLACEMENT MEASUREMENT SYSTEM

TECHNICAL FIELD

The invention relates to a grating measurement system, more particularly, to a dual-frequency grating interferometer measurement system.

BACKGROUND

Grating measurement system is widely used in various electromechanical devices as a typical displacement sensor. The measurement principle of the grating measurement system is mainly based on Moiré principle and principle of diffraction and interference. The grating measurement system based on Moiré principle is preferred for displacement measurement of various electromechanical devices as a fully developed displacement sensor due to its numerous advantages such as high resolution, high precision, lower cost and easiness to install and adapt.

In semiconductor manufacturing equipment, a lithography machine is the key device in semiconductor chip manufacture. An ultra-precision workbench is the core subsystem of the lithography machine, and is used for carrying the mask plates and silicon wafer to perform high speed ultra-precision stepping scanning movements. The ultra-precision workbench is the most typical system in the ultra-precision movement system due to its movement characteristics, such as high speed, high acceleration, large-stroke, ultra-precision, multiple degrees-of-freedom. In order to achieve the above movements, a dual-frequency laser interferometer measurement system is typically utilized for measuring multiple-degrees-of-freedom displacement of the ultra-precision workbench in the ultra-precision workbench. However, as the movement indexes for measurement preciseness, measurement distance and measurement speed increase continually, the dual-frequency laser light interferometer is difficult to meet the measurement requirement due to a series of problems, such as environmental sensitivity, difficulties in improving measurement speed, space occupation, high price, difficulties in designing and manufacturing a workpiece table as a measuring target.

In view of the above problems, a series of researches, concentrating mainly on grating measurement systems based on diffraction and interference principle, are performed by a lot of large corporations and research institutes in the field of ultra-precision measurement all around the world, and research achievements are disclosed in numerous patents and papers. U.S. patents owned by ASML, Netherland, U.S. Pat. No. 7,102,729B2 (publication date: Aug. 4, 2005), U.S. Pat. No. 7,483,120B2 (publication date: Nov. 15, 2007), U.S. Pat. No. 7,940,392B2 (publication date: Dec. 24, 2009), US2010/0321665A1 (publication date: Dec. 23, 2010) disclosed a plane grating measurement system and arrangement scheme for lithography machine ultra-precision workbench, which mainly utilizes a one or two dimensional plane grating to measure the long-stroke horizontal displacement of the workpiece stage with the cooperation of a reading head, and utilizes height sensors, such as eddy current or interferometers, to measure displacement in height direction, however, the measurement precision of the workpiece stage was limited by the application of various sensors. ZYGO, American company, discloses a grating measurement system applied to a ultra-precision workbench for lithography machine, which also utilizes a one or two dimensional plane grating to measure displacement of the workbench with the cooperation of a specific reading head, and is capable of performing horizontal and vertical displacement measurement at the same time, in US patent publication number US2011/0255096A1 (publication date: Oct. 20, 2011). CANON, Japanese company, discloses a heterodyne interferometer, which utilizes a grating as an target lens, and could only perform one dimensional measurement, in US patent publication number US2011/0096334A1 (publication date: Apr. 28, 2011). GAOWEI, Japanese scholar, proposes a single-frequency two-dimensional grating measurement system utilizing diffraction and interference principle, which is capable of performing horizontal and vertical displacement measurement at the same time, and the preciseness of which was difficult to be guaranteed due to utilization of single frequency laser and measurement signal being susceptible to disturbance, in "Design and construction of a two-degree-of-freedom linear encoder for nanometric measurement of stage position and straightness. Precision Engineering 34 (2010) 145-155".

In view of the limitations on the above technical solution, a heterodyne grating interferometer measurement system utilizing optical beat frequency theory capable of achieving sub-nanometer and even higher resolution and preciseness and measuring long-stroke horizontal displacement and vertical displacement at the same time is required. By using the measurement system as the displacement measurement device for a ultra-precision workbench, the defects of laser interferometer measurement systems in ultra-precision workbench can be diminished effectively, thereby improving the performance of the ultra-precision workbench of the lithography machine.

SUMMARY

It is an objective of the present invention to provide a dual-frequency grating interferometer measurement system which can achieve sub-nanometer and even higher resolution and preciseness, and is able to measure long-stroke horizontal displacement and vertical displacement at the same time.

The technical solutions of the present invention are described below.

A dual-frequency grating interferometer displacement measurement system comprises a dual-frequency laser 1, an interferometer 2, a measurement grating 3 and an electronic signal processing component 4, the interferometer 2 comprising a polarization beam splitter 21, a wave plate, a refraction element 23, a reflector 24, an analyzer 25 and a photoelectric detector.

Dual-frequency laser light is emitted from the dual-frequency laser 1 and passes through the polarization beam splitter 21 to be split into reference light and measurement light, the reference light passes through a reference arm quarter-wave plate 22' and is reflected by the reflector 24 so as to generate two beams of parallel reference light, which transmit through the reference arm quarter-wave plate 22', the polarization beam splitter 21, the analyzer 25 and then are incident to a first photoelectric detector 26 and a second photoelectric detector 27 respectively; the measurement light transmits through a measuring arm quarter-wave plate 22 and the refraction element 23 and then is incident to the measurement grating 3 to diffract, positive and negative first-order diffracted measurement light beams transmit through the refraction element 23, the measuring arm quarter-wave plate 22, the polarization beam splitter 21, the analyzer 25 and then are incident to the first photoelectric detector 26 and the second photoelectric detector 27; the two beams of parallel reference light along with the two beams of diffracted measurement light generate beat frequency electric signals through the first photoelectric detector 26 and the second photoelectric detector 27, which beat frequency electric signals are then transmitted to the electronic signal processing component 4 to be processed; meanwhile, the dual-frequency laser 1 outputs a reference signal to the electronic signal processing component 4; when the interferometer 2 and the measurement grating 3 move relatively in x and z directions, linear displacements in two directions are output by the electronic signal processing component 4.

The technical characteristic of the present invention is that: the receiver 5 is comprised of the analyzer 25, the first photoelectric detector 26 and the second photoelectric detector 27, and two beams of parallel reference light and measurement light emitted from the polarization beam splitter 21 are transmitted to the receiver through optical fibers.

Another technical characteristic of the present invention is that: the receiver 5 and the electronic signal processing component 4 form an integral structure.

The reflector 24 of the present invention is comprised of a reference grating 241 and reflective mirrors 2a, the reference light is incident to the reference grating 241 to diffract and reflect so as to form two beams of parallel light via the reflective mirror 2a; or the reflector 24 is comprised of a reference grating 241 and a lens 2b, the reference light is incident to the reference grating 241 to diffract and reflect so as to form two beams of parallel light through the lens 2b; or the reflector 24 is comprised of a reference grating 241 and a prism 2c, the reference light is incident to the reference grating 241 to diffract and reflect so as to form two beams of parallel light through the prism 2c; or the reflector 24 is a rectangular prism 242, the cross section of which comprises a right trapezoid and an isosceles right triangle, the joint surface of the right trapezoid and the isosceles right triangle is a light splitting face, the reference light is split into two beams of light after being incident to the light splitting face of the rectangular prism 242, and the two beams of light are reflected by a 45° reflecting face to form two beams of parallel light respectively.

The refraction element 23 of the present invention is reflective mirrors 2a, or a lens 2b or a prism 2c.

The present invention provides a dual-frequency grating interferometer displacement measurement system, which provides advantages and prominent effects of: (1) achieving sub-nanometer and even higher resolution and preciseness, the measurement preciseness being uneasy to be affected by changes of external environment; (2) being capable of measuring long-stroke horizontal displacement and vertical displacement at the same time; (3) the reading head of the measurement system having small size and light weight, easy to mount and convenient for use; (4) on the basis of meeting the measurement requirements, being capable of effectively reducing the size and mass of the workpiece stage, improving dynamic performance of the workpiece stage so as to comprehensively improve the overall performance of the workpiece stage when applied to a measurement system for a ultra-precision workbench of a lithography machine.

In the figures: 1—dual-frequency laser head; 2—interferometer; 3—measurement grating; 4—electronic signal processing component; 5—receiver; 6—integral structural part; 21—polarization beam splitter; 22—measuring arm quarter-wave plate; 22'—reference arm quarter-wave plate, 23—refraction element; 24—reflector; 25—analyzer; 26—first photoelectric detector; 27—second photoelectric detector; 241—reference grating; 242—rectangular prism; 2a—reflective mirror; 2b—lens; 2c—prism.

DETAILED DESCRIPTION

The embodiments of the present invention are described below in details in connection with the accompanying drawings.

Figure 1:
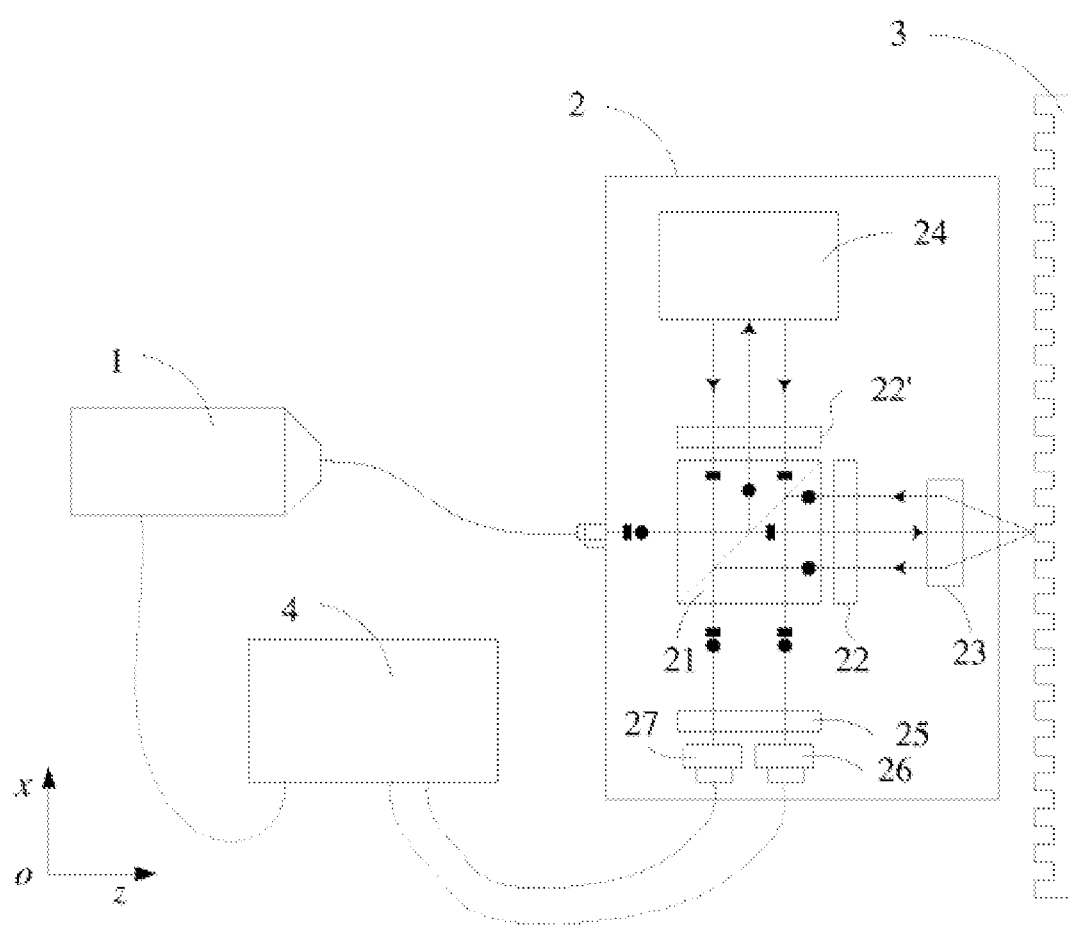
FIG. 1 is a schematic view illustrating the structure of the embodiment of a first type of dual-frequency grating interferometer displacement measurement system of the present invention.

Please refer to FIG. 1, which is a schematic view illustrating the embodiment of a first type of dual-frequency grating interferometer displacement measurement system of the present invention. The dual-frequency grating interferometer displacement measurement system comprises a dual-frequency laser 1, an interferometer 2, a measurement grating 3 and an electronic signal processing component 4. The interferometer 2 comprises a polarization beam splitter 21, a wave plate, a refraction element 23, a reflector 24, an analyzer 25 and a photoelectric detector.

Dual-frequency laser light is emitted from the dual-frequency laser 1 and transmitted through an optical fiber and is split into reference light and measurement light by the polarization beam splitter 21, the reference light passes through a reference arm quarter-wave plate 22' and is reflected by the reflector 24 so as to generate two beams of parallel reference light, which transmit through the reference arm quarter-wave plate 22', the polarization beam splitter 21, the analyzer 25 and then are incident to a first photoelectric detector 26 and a second photoelectric detector 27 respectively; the measurement light transmits through a measuring arm quarter-wave plate 22 and the refraction element 23 and then are incident to the measurement grating 3 to diffract, positive and negative first-order diffracted measurement light beams transmit through the refraction element 23, the measuring arm quarter-wave plate 22, the polarization beam splitter 21, the analyzer 25 and then are incident to the first photoelectric detector 26 and the second photoelectric detector 27 respectively; the two beams of parallel reference light along with the positive and negative first-order diffracted measurement light beams form beat frequency electric signals through the first photoelectric detector 26 and the second photoelectric detector 27, which beat frequency electric signals are then transmitted to the electronic signal processing component 4 to be processed; meanwhile, the dual-frequency laser 1 outputs a reference signal to the electronic signal processing component 4; when the interferometer 2 and the measurement grating 3 move relatively in x and z directions, linear displacements in two directions are output by the electronic signal processing component 4.

Figure 2:
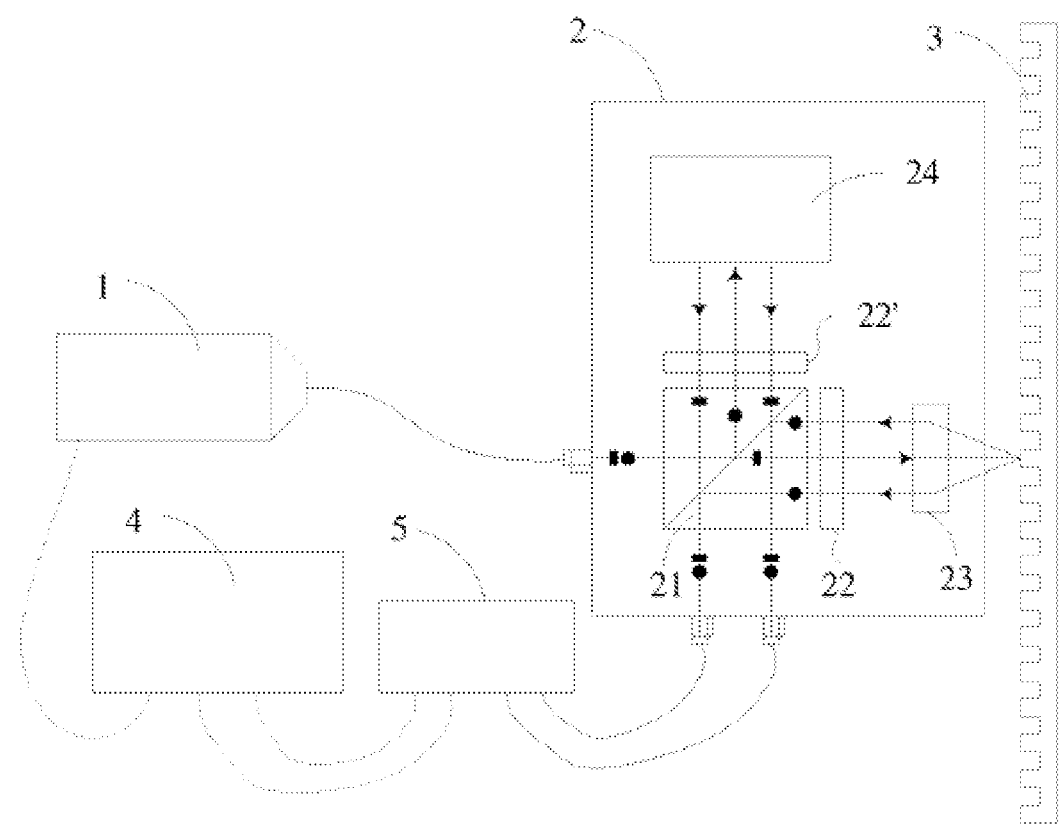
FIG. 2 is a schematic view illustrating the structure of the embodiment of a second type of dual-frequency grating interferometer displacement measurement system of the present invention.

Please refer to FIG. 2, which is a schematic view illustrating the embodiment of a second type of dual-frequency grating interferometer displacement measurement system of the present invention. The present embodiment is based on the first embodiment, and the receiver 5 is comprised of the analyzer 25, the first photoelectric detector 26 and the second photoelectric detector 27, and beams of parallel reference light and measurement light emitted from the polarization beam splitter 21 are transmitted to the receiver 5 through optical fibers. The measurement system employing such embodiment is capable of lowering the complexity of the interferometer, and reducing the size and weight of the interferometer at the same time. With the receiver 5, the electric signal gets easy to be preprocessed after optoelectric conversion, thus the anti-interference capability of the system signal is improved.

Figure 3:
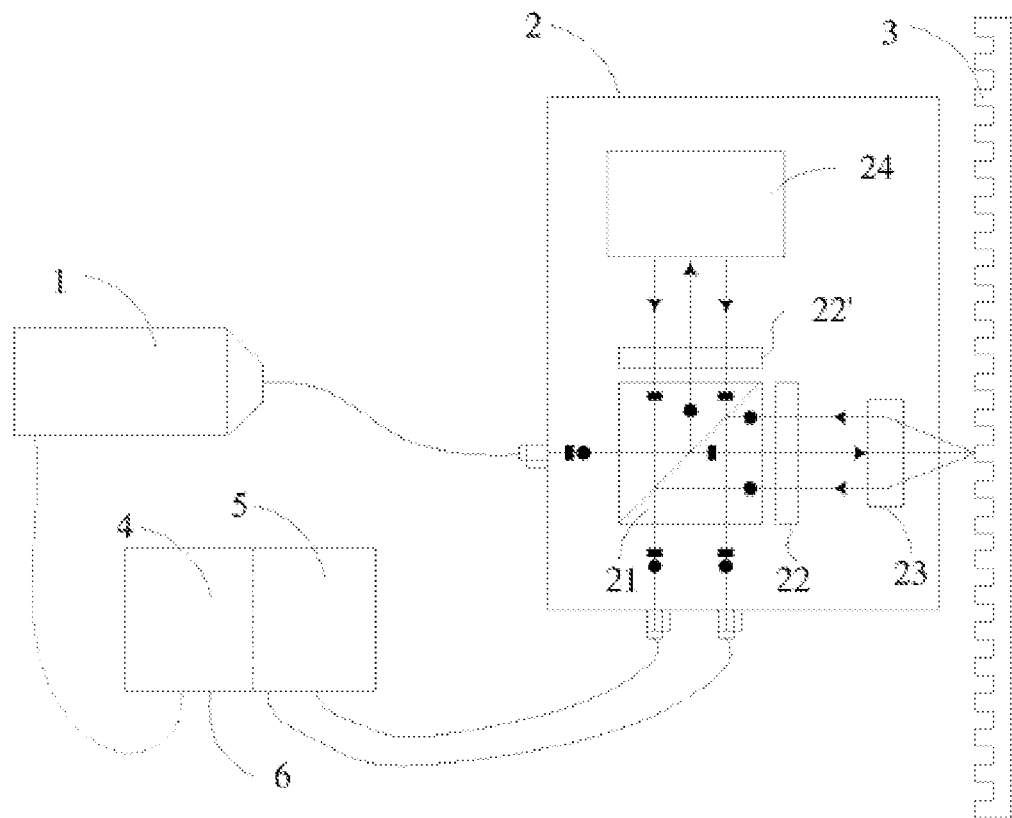
FIG. 3 is a schematic view illustrating the structure of the embodiment of a third type of dual-frequency grating interferometer displacement measurement system of the present invention.

Please refer to FIG. 3, which is a schematic view illustrating the embodiment of a third type of dual-frequency grating interferometer displacement measurement system of the present invention. The present embodiment is based on the second embodiment, and an integral structural part 6 is formed by the receiver 5 and the electronic signal processing component 4. The measurement system employing such embodiment is capable of reducing the size and weight of the interferometer, improving the anti-interference capability of the system signal and improving system integration.

Figure 4:
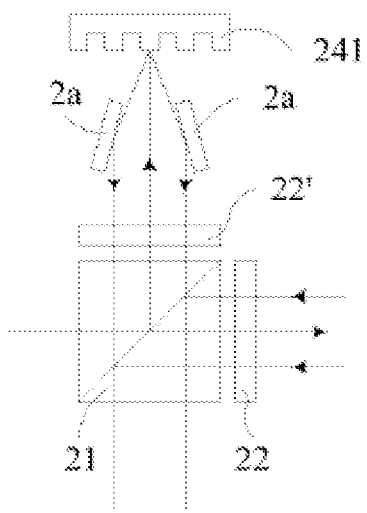
FIG. 4 is a schematic view illustrating the embodiment of a first type of reflector of the present invention.

Please refer to FIG. 4, which is a schematic view illustrating the embodiment of the first type of reflector of the present invention. The reflector 24 is comprised of a reference grating 241 and reflective mirrors 2a, and the reference light is incident to the reference grating 241 to diffract and reflect so as to form two beams of parallel light via the reflective mirror 2a.

Figure 5:
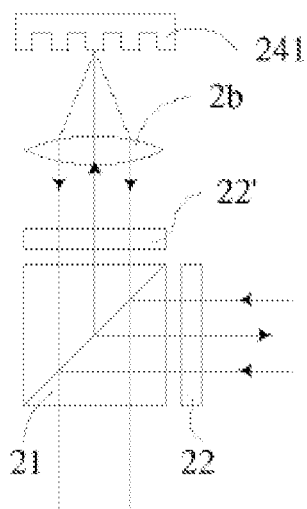
FIG. 5 is a schematic view illustrating the embodiment of a second type of reflector of the present invention.

Please refer to FIG. 5, which is a schematic view illustrating the embodiment of the second type of reflector of the present invention. The reflector 24 is comprised of a reference grating 241 and a lens 2b, and the reference light is incident to the reference grating 241 to diffract and reflect so as to form two beams of parallel light through the lens 2b.

Figure 6:
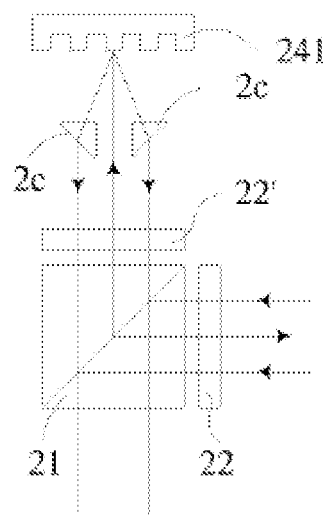
FIG. 6 is a schematic view illustrating the embodiment of a third type of reflector of the present invention.

Please refer to FIG. 6, which is a schematic view illustrating the embodiment of a reflector of the present invention. The reflector 24 is comprised of a reference grating 241 and a prism 2c, and the reference light is incident to the reference grating 241 to diffract and reflect so as to form two beams of parallel light through the prism 2c.

Figure 7:
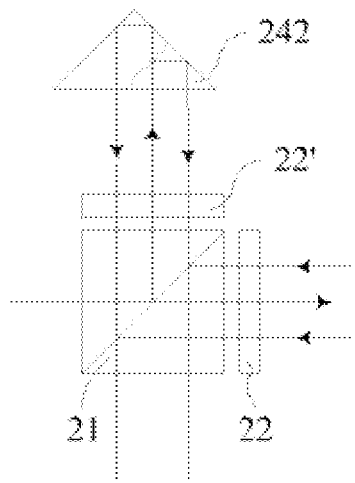
FIG. 7 is a schematic view illustrating the embodiment of a forth type of reflector of the present invention.

Please refer to FIG. 7, which is a schematic view illustrating the embodiment of a reflector of the present invention. The reflector 24 is a rectangular prism 242, the cross section of which is comprised of a right trapezoid and an isosceles right triangle, the joint surface of the right trapezoid and the isosceles right triangle is a light splitting face, the reference light is split into two beams of light after being incident to the light splitting face of the rectangular prism 242, and the two beams of light are reflected by a 45° reflecting face to form two beams of parallel light respectively.

Figure 8:
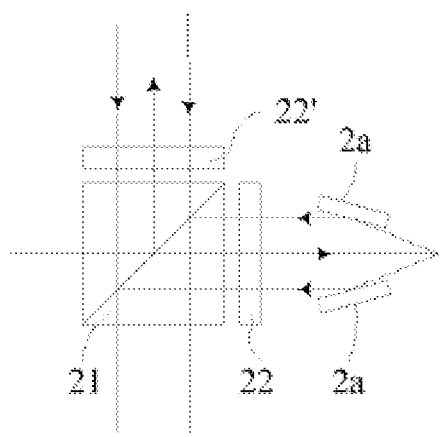
FIG. 8 is a schematic view illustrating the embodiment of a first type of refraction element of the present invention.

Please refer to FIG. 8, which is a schematic view illustrating the embodiment of a refraction element of the present invention. The refraction element 23 is reflective mirrors 2a.

Figure 9:
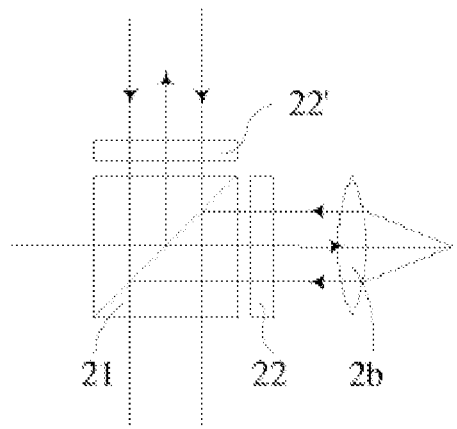
FIG. 9 is a schematic view illustrating the embodiment of a second type of refraction element of the present invention.

Please refer to FIG. 9, which is a schematic view illustrating the embodiment of a refraction element of the present invention. The refraction element 23 is a lens 2b.

Figure 10:
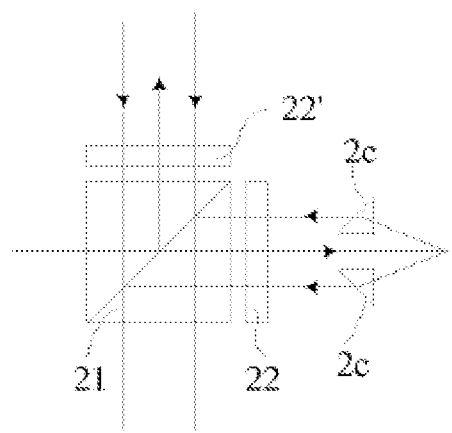
FIG. 10 is a schematic view illustrating the embodiment of a third type of refraction element of the present invention.

Please refer to FIG. 10, which is a schematic view illustrating the embodiment of a refraction element of the present invention. The refraction element 23 is a prism 2c.

The above dual-frequency grating interferometer displacement measurement system is capable of achieving sub-nanometer and even higher resolution and preciseness and measuring long-stroke horizontal displacement and vertical displacement at the same time, and has numerous advantages such as small size, light weight, robustness against environmental changes and the like. When the dual-frequency grating interferometer displacement measurement system is applied to displacement measurement of an ultra-precision workbench of a lithography machine, overall performance of the workpiece stage system can be improved, meeting stringent performance requirements on the workpiece stage system, which contributes to improving the overall performance of the lithography machine at the same time.

The invention claimed is:

1. A dual-frequency grating interferometer displacement measurement system, comprising a dual-frequency laser, an interferometer, a measurement grating, and an electronic signal processing component, and wherein the interferometer comprises a polarization beam splitter, a wave plate, a refraction element, a reflector, an analyzer, and a photoelectric detector, wherein dual-frequency laser light is emitted from the dual-frequency laser and transmitted through an optical fiber and is split into reference light and measurement light by the polarization beam splitter, wherein the reference light passes through a reference arm quarter-wave plate and is reflected by the reflector so as to generate two beams of parallel reference light, which transmit through the reference arm quarter-wave plate, the polarization beam splitter, and the analyzer, and then are incident to a first photoelectric detector and a second photoelectric detector, respectively, wherein the measurement light transmits through a measuring arm quarter-wave plate and the refraction element, and then is incident to the measurement grating to diffract, wherein positive and negative first-order diffracted measurement light transmit through the refraction element, the measuring arm quarter-wave plate, the polarization beam splitter, and the analyzer, and then are incident to the first photoelectric detector and the second photoelectric detector, wherein the two beams of parallel reference light along with the two beams of diffracted measurement light form beat frequency electric signals through the first photoelectric detector and the second photoelectric detector, which beat frequency electric signals are then transmitted to the electronic signal processing component to be processed, wherein the dual-frequency laser outputs a reference signal to the electronic signal processing component, and wherein when the interferometer and the measurement grating move relatively in x and z directions, linear displacements in two directions are output by the electronic signal processing component.

2. The dual-frequency grating interferometer displacement measurement system of claim 1, characterized in that: a receiver is comprised of the analyzer, the first photoelectric detector, and the second photoelectric detector, and beams of parallel reference light and measurement light emitted from the polarization beam splitter are transmitted to the receiver through optical fibers.

3. The dual-frequency grating interferometer displacement measurement system of claim 2, characterized in that: an integral structural part is formed by the receiver and the electronic signal processing component.

4. The dual-frequency grating interferometer displacement measurement system of claim 1, characterized in that: the reflector is comprised of a reference grating and reflective mirrors, and the reference light is incident to the reference grating to diffract and reflect so as to form two beams of parallel light via the reflective mirrors.

5. The dual-frequency grating interferometer displacement measurement system of claim 1, characterized in that: the reflector is comprised of a reference grating and a lens, and the reference light is incident to the reference grating to diffract and reflect so as to form two beams of parallel light through the lens.

6. The dual-frequency grating interferometer displacement measurement system of claim 1, characterized in that: the reflector is comprised of a reference grating and a prism, and the reference light is incident to the reference grating to diffract and reflect so as to form two beams of parallel light through the prism.

7. The dual-frequency grating interferometer displacement measurement system of claim 1, characterized in that: the reflector is a rectangular prism, the cross section of which is comprised of a right trapezoid and an isosceles right triangle, the joint surface of the right trapezoid and the isosceles right triangle is a light splitting face, the reference light is split into two beams of light after being incident to the light splitting face of the rectangular prism, and the two beams of light are reflected by a 45° reflecting face to form two beams of parallel light respectively.

8. The dual-frequency grating interferometer displacement measurement system of claim 1, characterized in that: the refraction element is reflective mirrors, or a lens or a prism.

* * * * *